United States Patent [19]
Diez

[11] Patent Number: 5,983,717
[45] Date of Patent: Nov. 16, 1999

[54] METHOD AND APPARATUS FOR BALANCING A MOTOR VEHICLE WHEEL

[75] Inventor: Ulrich Diez, Reichshof, Germany

[73] Assignee: Hofmann Werkstatt-Technik GmbH, Pfungstadt, Germany

[21] Appl. No.: 08/996,393

[22] Filed: Dec. 23, 1997

[30] Foreign Application Priority Data

Dec. 20, 1996 [DE] Germany .......................... 196 53 663

[51] Int. Cl.⁶ .................................................. G01M 1/16
[52] U.S. Cl. ............................................................. 73/462
[58] Field of Search .............................. 73/462, 460, 66; 364/528.14; 301/5.21

[56] References Cited

U.S. PATENT DOCUMENTS

| | | | |
|---|---|---|---|
| 2,697,345 | 12/1954 | Currier | 73/66 |
| 5,172,596 | 12/1992 | Rothamel et al. | 73/462 |
| 5,178,011 | 1/1993 | Ohms et al. | 73/462 |

FOREIGN PATENT DOCUMENTS

| | | |
|---|---|---|
| 1 801 947 | 12/1959 | Germany . |
| 38 03 325 | 8/1989 | Germany . |

*Primary Examiner*—Hezron Williams
*Assistant Examiner*—Richard A. Moller
*Attorney, Agent, or Firm*—Pillsbury Madison & Sutro LLP

[57] ABSTRACT

In a method and apparatus for balancing a motor vehicle wheel comprising a wheel with pneumatic tire thereon, the wheel is clamped on to a measuring shaft of a balancing machine, and geometrical data of the wheel are sensed and stored. A measuring run is conducted for ascertaining an unbalance, and for determining at least one balancing vector in accordance with a balancing program selected depending on the type of wheel. The material of the wheel is detected with a sensor. The balancing program for determining the nature of balancing weight and its positioning in a balancing plane on the wheel is selected depending on the signal obtained in the sensing operation using the sensor. The balancing vector is determined in the electronic system of the machine for the balancing program. At least one balancing weight is then fixed to the wheel.

23 Claims, 1 Drawing Sheet

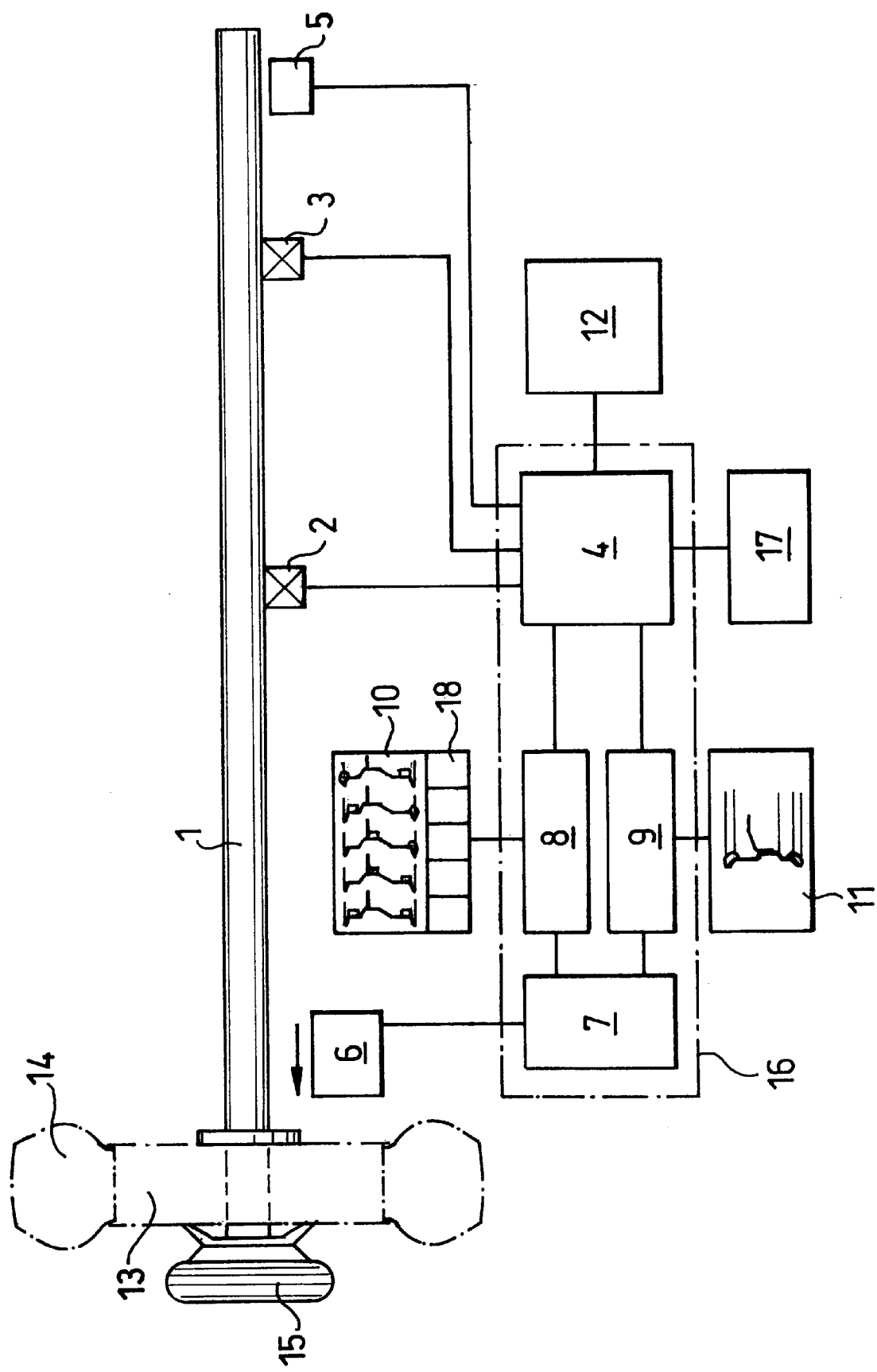

METHOD AND APPARATUS FOR BALANCING A MOTOR VEHICLE WHEEL

FIELD OF THE INVENTION

The invention concerns a method and apparatus for balancing a motor vehicle wheel comprising the wheel itself and a pneumatic tire thereon.

BACKGROUND OF THE INVENTION

A typical form of procedure for balancing a motor vehicle wheel unit comprising the wheel itself such as a disk wheel and a pneumatic tire carried thereon provides that the vehicle wheel is clamped on a measuring spindle of a balancing machine and the geometrical data of the vehicle wheel are sensed by means of a sensing device and stored. At least one measuring run is effected for ascertaining unbalance of the vehicle wheel and for determining at least one balancing vector, involving evaluation of measurement signals outputted by measurement value sensors and the geometrical data of the wheel, in dependence on a set balancing program. At least one balancing weight is fixed to the vehicle wheel to compensate for the unbalance which is ascertained in that way.

A method and an apparatus of that kind are to be found in DE 42 29 865 C2.

Conventional balancing machines, for example Geodyna 5000 or Geodyna 5500, see the prospectus from Hofmann Werkstatt-Technik GmbH, Pfungstadt, Germany, imprint 9502101 03.94, have various balancing programs. The positioning of the one or more balancing weights on the disk wheel can be determined by means of such balancing programs. Usually there is a standard program for disk wheels consisting of steel and five selectable balancing programs for disk wheels comprising light metal or alloy, for example aluminum.

It will be noted at this point that the term light metal is used herein to denote wheels made of a light metal or a light metal alloy, for example aluminum, aluminum alloy or the like.

That ensures that, depending on the type of disk wheel involved, the balancing weights are positioned on the wheel in consideration of the requirements for optimum smoothness of operation and the visual appearance of the wheel, when carrying out the unbalance compensating operation. The choice of the appropriate balancing program is effected in dependence on visual assessment of the motor vehicle wheel by the operator of the machine. In general it is not possible to effect an assessment on the basis of the weight involved because the weight of the wheel is essentially determined by the tire fitted on the disk wheel. In that situation incorrect assessments may occur so that the wrong balancing program is then selected.

German utility model No 1 801 947 discloses a balancing apparatus in which balancing weights which are sorted in accordance with the size thereof, are kept in stock in containers or other storage assemblies. After a measuring run which involves determining the balancing weight that is required for a test body, the appropriate container or storage assembly which contains that balancing weight is identified by a respective marking device in order to make it easier for the operator to have immediate and ready access to the correct balancing weight.

DE 38 03 325 A1 discloses a method of balancing a motor vehicle wheel or the like, in which a stationary wheel which is clamped on to a shaft of a balancing machine is caused to oscillate and thereupon wheel-specific data which are obtained from sensor output signals from electrical sensors coupled to the shaft are compared to stored pattern signals which are characteristic in respect of different disk wheels. That procedure makes it possible to determine the respective type of wheel to be balanced.

U.S. Pat. No. 2,697,345 discloses the use of magnetic test balancing weights when balancing wheels with steel rims. A freely rotatable wheel to be balanced rotates into a given position, by virtue of its unbalance, under the effect of the force of gravity. One or more magnetic test balancing weights are applied to the rim flange to compensate for the unbalance, and then replaced by conventional permanently fitted balancing weights.

SUMMARY OF THE INVENTION

An object of the present invention is to provide a method of balancing a motor vehicle wheel in which there is a reduced risk of incorrect assessment of the type of disk wheel involved.

Another object of the present invention is to provide a method of balancing a motor vehicle wheel unit comprising a pneumatic tire mounted on a disk wheel, which permits accurate balancing results in an at least substantially automated procedure and with a reduced risk of operator error.

Still another object of the present invention is to provide a method of balancing a motor vehicle wheel unit comprising a disk wheel and a pneumatic tire mounted thereon which involves ascertaining the nature of the wheel to ensure optimum balancing results.

Yet another object of the present invention is to provide an apparatus for balancing a motor vehicle wheel unit comprising a wheel and a pneumatic tire mounted thereon, which can operate reliably to afford accurate results in an at least substantially automated procedure.

In accordance with the principles of the present invention, in the method aspect, the foregoing and other objects are attained by a method of balancing a motor vehicle wheel comprising a wheel and a pneumatic tire mounted thereon, wherein the motor vehicle wheel is clamped on to a measuring spindle of a balancing machine. The geometrical data of the wheel are sensed and stored, and at least one measuring run is effected for ascertaining an unbalance of the wheel and for determining at least one balancing vector for the balancing mass and the balancing position in accordance with a balancing program which is selected depending on the type and material of the wheel itself, for determining the at least one balancing weight to be fitted and its position in at least one balancing plane on the motor vehicle wheel. The balancing vector is determined for the balancing program which is selected in that way, and at least one balancing weight is fixed to the motor vehicle wheel in dependence on the balancing vector to compensate for the ascertained unbalance of the wheel. To detect the material of the wheel itself, a sensing operation is effected by means of a sensor, and the balancing program is selected in dependence on the signal obtained in the sensing operation using the sensor.

Further in accordance with the present invention, in the apparatus aspect, the foregoing and other objects are attained by an apparatus for balancing a motor vehicle wheel comprising a wheel and a pneumatic tire mounted thereon, comprising a measuring spindle on which a wheel to be balanced can be fixed in a centered condition, by means of a clamping device. Measurement value sensors are connected to the measuring spindle and output measurement signals in dependence on a wheel unbalance which is ascertained by centrifugal force measurement. A sensing means is provided for sensing geometrical data of the wheel. The machine has an electronic system which, from the measurement signals of the measurement value sensors obtained in a measuring run and from the geometrical data of the wheel, forms at least one balancing vector for the balancing mass and for the balancing position on the wheel in dependence on a balancing program which is set in accordance with the type of wheel. Also connected to the electronic system of the machine is a material sensor with which the wheel secured to the measuring spindle can be sensed and which triggers first and second switching conditions of the electronic system. The one switching condition initiates a device for computing the balancing vector in accordance with a normal program for steel wheels while the other switching condition initiates a device for computing the balancing vector for light metal wheels. As noted above, light metal wheels also include alloy wheels.

As will be appreciated from the description of a preferred embodiment of the present invention as set out hereinafter, the invention provides for sensing a wheel to be balanced by means of a sensor which detects the material of the wheel such as a disk wheel. In dependence on such material detection, the machine automatically selects the correct balancing program stored therein. That provides that the operation of determining the balancing vector or vectors, as determined by the balancing mass and the balancing position, is effected on the basis of a balancing program selected by the machine in dependence on detection of the material of the wheel, without any misjudgment on the part of the service operator. In that situation the material sensor distinguishes whether the actual wheel of the motor vehicle wheel unit comprises a non-ferromagnetic material, in particular light metal such as for example Al, Mg or Ti or alloys and mixtures thereof, or a ferromagnetic material, for example more particularly steel. The procedure therefore no longer suffers from errors or faults due to visual misjudgments on the part of the operator, which can be due to the fact that a disk wheel made of steel may be colored so as to appear to be a disk wheel of light metal or conversely, a light metal or alloy wheel may appear to be made of steel. This therefore affords the necessary requirement for selecting the correct balancing program when determining the balancing vector. Therefore the situation for example cannot occur where clip-type weights which are intended for steel wheel rims are fitted by hammering to the rim flanges of light metal or alloy wheel rims. That therefore eliminates the risk of damaging light metal or alloy rims by virtue of incorrectly assessing the wheel.

In many cases, such as for example in regard to the above-mentioned machines Geodyna 5000 and Geodyna 5500 the balancing program for light metal wheels contains different programs for the positioning of balancing weights. That selection is generally effected in dependence on the shape of the rim of the disk wheel. As in the case of those known machines, in the switching condition of the electronic system of the machine, which is triggered by the material sensor and in which the program for light metal disk wheels is initiated, the various programs, for example five thereof, which show different weight positions for the wheel, are indicated to the operator by a display on the machine, for example on a monitor or on an LC-display.

In accordance with a preferred feature of the invention the sensing operation using the sensor for the wheel material can be effected by contact or in a contact-less mode, while either galvanic or capacitive or inductive coupling or a selective combination of such coupling modes to the wheel material can be adopted. The detection criteria are a ferromagnetic material, in particular for steel wheels, and non-ferromagnetic material for light metal wheels.

For that purpose, in another preferred feature of the invention, it is possible to use a sensor which is responsive to a ferromagnetic material and which in particular is responsive only to ferromagnetic material, for example an inductive proximity switch, which is disposed in the proximity of or in contact with the wheel to be sensed. The proximity switch can be of a known design configuration (in this respect reference may be made for example to 'Elektrotechnik' 57, issue 24.27. December 1975, pages 39 to 42). Known proximity switches serve to detect an object at a given location. In contrast thereto, the present invention can provide that an inductive proximity switch is used to distinguish between different wheel materials when dealing with motor vehicle wheel units, wherein one switching condition shows that the wheel comprises a ferromagnetic material such as more particularly steel while the other switching condition of the proximity switch indicates that the wheel comprises non-ferromagnetic material and more particularly light metal. In dependence on those two switching conditions, in the electronic system of the machine the appropriate balancing program for a steel wheel or for a light metal wheel is selected and the respectively associated balancing vector which involves the balancing mass and the balancing position or angular position of the unbalance and the balancing plane in the axial direction of the measuring spindle or shaft is determined on the disk wheel. If balancing is effected statically, one balancing vector is sufficient, while in the case of dynamic balancing, a balancing vector is ascertained for each of two balancing planes. In the case of a light metal or alloy wheel the balancing vector can be split up into first and second balancing vectors which are positioned behind the spokes of the wheel if the disk wheel has interruptions in the central dish-like part of the wheel, with remaining spokes or legs. Preferably that step of splitting up the balancing vector is effected in the balancing plane which is closest to the plane of the spokes or the central dish-like part of the wheel (in that respect attention is directed to EP 0 681 170 A1).

In a further preferred feature of the invention the material sensor and in particular an inductive proximity switch can be arranged on a component which is present on the balancing machine in any case and which can be moved into the vicinity of the wheel to be balanced. A suitable arrangement for that purpose involves in particular a sensing device, for example in the form of a sensing rod or bar (reference may be directed in this respect to DE 42 29 865 C2) or arranging the sensor on a wheel guard hood of the balancing machine or on a holding bracket. Further positions which are suitable in that respect are the region of the measuring shaft or spindle on which the motor vehicle wheel is clamped thereon, or a part of the clamping device with which the motor vehicle wheel is fixed to the measuring shaft or spindle.

Advantageously, the respective switching condition of the material sensor can be displayed so that the service operator uses the appropriate clamping tools for clamping the wheel on the measuring spindle or shaft. For that purpose, for example the cup-like pressure member which serves for centering a light metal wheel at the center thereof may additionally be provided with a protective cap, for example more especially of plastic material, or it is possible to use a special plate member for pressing against the wheel (reference is directed to Geodyna 5000/5500, the prospectus from Hofmann Werkstatt-Technik GmbH, Pfungstadt, Germany, imprint 9502101 03.94). In regard to the combination of the balancing machine according to the invention with a tire fitting machine, for example within a wheel service line or system (reference may be directed in this respect to the ecomont system, see the prospectus from Hofmann Werkstatt-technik GmbH, Pfungstadt, Germany, imprint 9402424 07.95), the sensing operation using the wheel material sensor can already be implemented at the tire fitting machine, in which case the wheel is fixed in position in such a way as to treat it carefully and gently not only when the wheel is being clamped in the tire fitting machine but also when the wheel is being fixed on the measuring shaft or spindle of the balancing machine. The material detection result which is obtained in relation to the tire fitting machine can advantageously also be utilized when determining the balancing program and the nature of the balancing weights, as an embodiment of the principles of the present invention.

In order to facilitate service work, the kind of weight which is to be fitted to a wheel in a respective balancing plane can also be displayed to the service operator in dependence on the detected disk wheel material, for example by means of a display on a monitor or display unit or the like. For that purpose it is possible to provide a display for example in respect of an adhesive weight, a clip-on weight or, if both weights are to be used in connection with the balancing program in question, a display for both weights with the associated balancing planes. It is also possible for the different kinds of balancing weights to be held in readiness in different compartments or magazines, whereby, depending on the disk wheel material involved, access is permitted to the respective compartments or magazines only for the kind of balancing weight which is associated with the selected balancing program and/or the respective balancing plane.

Further objects, features and advantages of the invention will be apparent from the following description of a preferred embodiment thereof.

BRIEF DESCRIPTION OF THE DRAWING

The single FIGURE diagrammatically illustrates an embodiment of an apparatus for balancing a motor vehicle wheel.

DESCRIPTION OF THE PREFERRED EMBODIMENT

Referring therefore now to the drawing, reference numeral 1 therein denotes a measuring shaft or spindle of a balancing machine which is not shown in further detail. A motor vehicle wheel comprising the actual wheel 13 in the form illustrated as a disk wheel and a pneumatic tire 14 fitted thereon is fixed on the measuring spindle 1 by means of a suitable clamping device 15 which at the same time performs a wheel-centering function.

Reference numerals 2 and 3 in the drawing denote measurement value sensors, for example force transducers, which are arranged in operative association with the measuring spindle 1. The respective rotational angular position of the measuring spindle 1 is detected by means of an angular incremental sensor 5 which is also operatively associated with the measuring spindle 1. The measurement value sensors 2 and 3 and the sensor 5 are connected in known manner to an electronic system 16 of the machine, which includes a vector computing means 4. Geometrical data of the motor vehicle wheel which have been detected by means of a sensing device 17 are also inputted into the electronic system 16 and in particular the vector computing means 4. The sensing device 17 can be of any suitable construction and for example it may operate in a contact-less mode, for example optically, acoustically, in particular using ultra-sound, or the like, or it can operate by virtue of sensing contact, for example using one or more sensing rods or bars which detect the dimensions of the motor vehicle wheel and more especially the regions in which balancing weights can be positioned on the wheel.

From the measurement signals from the measurement value sensors 2 and 3, the angular information from the angular incremental sensor 5 and the geometrical data of the motor vehicle wheel, the vector computing means 4 determines a balancing vector for a respective balancing plane of the motor vehicle wheel. The balancing vector specifies the balancing mass and the angular position of the balancing mass on the motor vehicle wheel, more especially on the disk wheel 13, as is required for compensate for the ascertained unbalance from which the wheel is suffering. The balancing vector also depends on the respective axial position of the balancing plane in which mass balancing of the wheel is to be effected, for example by fixing a balancing weight to the wheel. The optimum position of the respective balancing plane in relation to the wheel 13 depends on the type of wheel, more especially in the case of a disk wheel. Depending on the type of disk wheel involved, computation of the balancing vector is effected in accordance with a given balancing program, either for steel wheels or light metal wheels.

Reference numeral 6 denotes a material sensor for sensing the material of the wheel to be balanced, for correctly determining the appropriate balancing program to be used. The material sensor 6 can be brought into contact with the disk wheel 13, in which case the sensor 6 is such that it is sensitive only in relation to a ferromagnetic material, more especially steel. For that purpose the sensor 6 can be for example in the form of an inductive proximity switch of conventional kind. If the material sensor 6 responds to the material of the wheel 13, that is a sign that the wheel comprises ferromagnetic material and thus steel as is the usual practice in connection with disk wheels for motor vehicles. If the material sensor 6 does not respond to the material of the wheel 13, that is an indication that the wheel 13 comprises non-ferromagnetic material, more specifically for example a light metal which is usual for disk wheels such as Al, Mg, Ti, or alloys or mixed alloys thereof. In many cases it is not possible to rely on the optical appearance of the wheel rim to ascertain the material from which the wheel is made. In addition, when a tire is fitted to a wheel, the weight of the total assembly of the wheel with the tire thereon does not afford a satisfactory criterion for deciding on what material the wheel is made of. The invention here provides a way in which that uncertainty in regard to selecting the correct balancing program can be eliminated.

For that purpose, in the illustrated embodiment of the invention, the material sensor 6 is connected by way of an initiator 7 to a device 8 for a balancing program for motor vehicle wheels with light metal disk wheels and a device 9 for a balancing program for motor vehicle wheels with steel disk wheels. By virtue of a yes/no decision, the initiator 7 produces one of two switching conditions. If the material sensor 6 detects a ferromagnetic material of a wheel 13, the device 9 is initiated. If on the other hand the material sensor 6 does not detect a ferromagnetic material, it is then the device 8 that is initiated. Suitable displays for a program for light metal wheels, which can be referred to as an aluminum program, and a normal program for steel wheel rims, can be connected to the device 8 and the device 9 respectively. As can be seen from the display 10 provided for the aluminum program, the aluminum program includes a plurality of balancing programs which can be determined by means of a keyboard or keypad as indicated at 18. The individual balancing programs differ from each other by virtue of the positioning of the balancing weights and the nature of the balancing weights, for example clip-on weights, adhesive weights and so forth. For example, in the case of a first balancing program, adhesive weights are disposed on the wheel rim surface which is towards the axis of the wheel, outside and inside the disk wheel surface which is vertical in relation to the wheel axis. In a second balancing program, both adhesive weights are disposed on the rim surface which is towards the wheel axis, within the wheel surface which is perpendicular to the wheel axis. In the third balancing program, a clip-on weight is provided on the inner wheel rim flange while an adhesive weight is provided at the inner wheel rim surface which is towards the wheel axis, in the proximity of the vertical surface of the disk wheel. In the fourth balancing program a clip-on weight is provided on the inner wheel rim flange and an adhesive weight is provided on the outwardly disposed wheel rim surface which is towards the wheel axis. In the fifth balancing program, a clip-on weight is fixed to the outwardly disposed wheel rim flange while an adhesive weight is fixed to the inwardly disposed wheel rim surface which is towards the wheel axis, in the proximity of the inner wheel rim flange.

It will be seen therefore that, depending on the wheel rim shape and/or the disk wheel shape involved, the appropriate balancing program can be selected in the device 18 for determining the balancing vector in the vector computing means 4, by means of the keyboard 8 which is coupled to the display device 10 and the device 8.

In the normal program, as the display 11 for the steel program shows, two clip-on weights are fixed in the two wheel rim flanges of the steel rim. That balancing program is suitable for compensating for unbalance at steel wheel rims and, if that balancing program is adopted, the vector computing means 4 ascertains the balancing vectors which are required to compensate for the ascertained unbalance of the wheel.

The respectively calculated balancing vectors can be displayed or indicated by means of a display device as diagrammatically indicated at 12. For that purpose the display device includes displays for a respective balancing plane and the balancing mass and for the angular position into which the motor vehicle wheel is to be turned to permit the operation of applying the balancing weights thereto to be performed.

Suitable locations for arranging the material sensor 6 are those components of the balancing machine which are arranged in the proximity of the motor vehicle wheel when clamped on the measuring spindle 1 or which can be moved into the proximity of the disk wheel 13 or can be brought into contact therewith. That involves for example the region of the measuring spindle 1, on which the motor vehicle wheel is clamped. The clamping device 15 may also include the material sensor 6. It is also possible for sensing rods or bars which can be applied to a disk wheel 13 from the inside and/or the outside thereof and which are for example a component of the sensing device 17 to be provided with the material sensor 6. It is further possible for the material sensor 6 to be carried on a wheel guard hood (not shown) which is brought into a position over the motor vehicle wheel during a measuring run. The material sensor 6 may be mounted on the fixing bracket for the wheel guard hood.

It will be appreciated that the above-described embodiment of the method and apparatus according to the invention has been set forth solely by way of example and illustration of the principles of the invention and that various modifications and alterations may be made therein without thereby departing from the spirit and scope of the invention.

What is claimed is:

1. A method of balancing a motor vehicle wheel having a pneumatic tire thereon, comprising the steps of:

clamping the motor vehicle wheel on to a measuring spindle of a balancing machine;

sensing and storing geometrical data of the wheel;

detecting positively the material of the wheel with a sensor and generating a corresponding electrical signal;

selecting a balancing program based on the electrical signal obtained in the detecting operation;

conducting at least one measuring run for ascertaining data corresponding to an unbalance condition of the motor vehicle wheel and for determining at least one balancing vector for the balancing mass and the balancing portion in accordance with a balancing program based on the geometrical data of the wheel and the wheel material;

determining at least one balancing weight and its positioning in at least one balancing plane on the wheel; and fixing at least one balancing weight to the motor vehicle wheel in accordance with the balancing vector to compensate for the ascertained unbalance condition.

2. A method as set forth in claim 1, wherein the sensing operation is effectuated by contact.

3. A method as set forth in claim 1, wherein the sensing operation is effectuated in a contactless mode.

4. A method as set forth in claim 1, wherein a sensing operation is effectuated by capacitive coupling to the wheel material.

5. A method as set forth in claim 1, wherein the sensing operation is effectuated by inductive coupling to the wheel material.

6. A method as set forth in claim 1, wherein the sensing operation is effectuated by galvanic coupling to the wheel material.

7. A method as set forth in claim 1, wherein the sensing operation is effectuated in accordance with the material detection criteria of light metal and ferromagnetic material.

8. A method as set forth in claim 7, wherein in dependence on the material sensing operation the balancing program is selectively switched to a program for light metal wheels and to a normal program for steel wheels.

9. A method as set forth in claim 1, wherein the sensing operation is effectuated by means of a sensor responsive to ferromagnetic material.

10. A method as set forth in claim 9, wherein in dependence on the material sensing operation the balancing program is selectively switched to a program for light metal wheels and to a normal program for steel wheels.

11. A method as set forth in claim 1, wherein selection of the balancing program is effectuated by a system which automatically selectively switches between a program for steel wheels and a display providing balancing programs for light metal wheels.

12. A method as set forth in claim 1, wherein the at least one balancing weight is displayed in dependence on the wheel material and the balancing program.

13. A method as set forth in claim 12,
wherein the motor vehicle wheel is balanced by fixing a clip-on weight as the balancing weight to the motor vehicle wheel.

14. A method as set forth in claim 12,
wherein the motor vehicle wheel is balanced by fixing an adhesive weight as the balancing weight to the motor vehicle wheel.

15. A method as set forth in claim 1,
wherein the at least one balancing weight to be fixed to the wheel is held in readiness for removal from a display device having different compartments or magazines for permitting access to different kinds of balancing weights.

16. An apparatus for balancing a motor vehicle wheel having a pneumatic tire thereon, comprising:
   a measuring spindle for carrying said motor wheel to be balanced and a clamp to hold the motor vehicle wheel on the measuring spindle in a centered condition;
   measuring value sensors connected to the measuring spindle to output measurement signals in dependence on motor vehicle wheel unbalance ascertained by centrifugal force measurement;
   a sensing system to determine geometrical data of the motor vehicle wheel; and
   a system which receives the measurement signals and the geometrical data and forms at least one balancing vector for the balancing mass and determines the balancing position on the motor vehicle wheel;
   a material sensor connected to the electronic system for positively sensing the type of material of the motor vehicle wheel said material sensor triggering one of a first and second switching condition of the system due to the sensed material;
   a first device initiated by said first switching condition that computes the balancing vector for steel wheels; and
   a second device initiated by said second switching condition that computes the balancing vector for light metal wheels.

17. An apparatus as set forth in claim 16,
wherein the material sensor is responsive to ferromagnetic material.

18. An apparatus as set forth in claim 16,
wherein the material sensor is in the form of an inductive proximity switch.

19. An apparatus as set forth in claim 16,
wherein the material sensor is arranged on the sensing means for sensing the geometrical data of the wheel.

20. An apparatus as set forth in claim 16 further including:
a wheel guard,
wherein the material sensor is provided on the wheel guard.

21. An apparatus as set forth in claim 16,
wherein the material sensor is arranged at the clamping means.

22. An apparatus as set forth in claim 16,
wherein the material sensor is arranged at the measuring spindle in the region in which the wheel is clamped thereon.

23. An apparatus as set forth in claim 16, further including:
a display for displaying the respective switching condition of the material sensor.

* * * * *

UNITED STATES PATENT AND TRADEMARK OFFICE
CERTIFICATE OF CORRECTION

PATENT NO. : 5,983,717
DATED : November 16, 1999
INVENTOR(S) : Ulrich Diez

It is certified that error appears in the above-identified patent and that said Letters Patent is hereby corrected as shown below:

Title page, item "[22] Filed: Dec. 23, 1997" to --[22] Filed: Dec. 22, 1997--.

Signed and Sealed this

Fifth Day of December, 2000

Attest:

Q. TODD DICKINSON

Attesting Officer

Director of Patents and Trademarks